Oct. 3, 1967  J. KURLOVICH  3,344,548
FISHING LURE

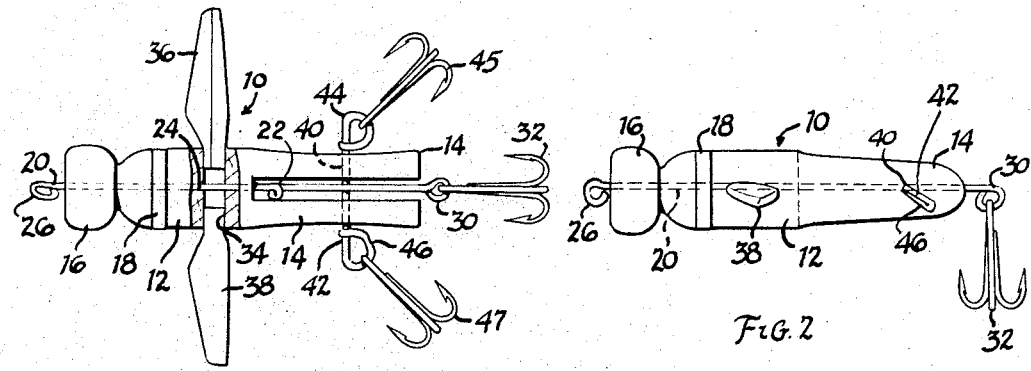
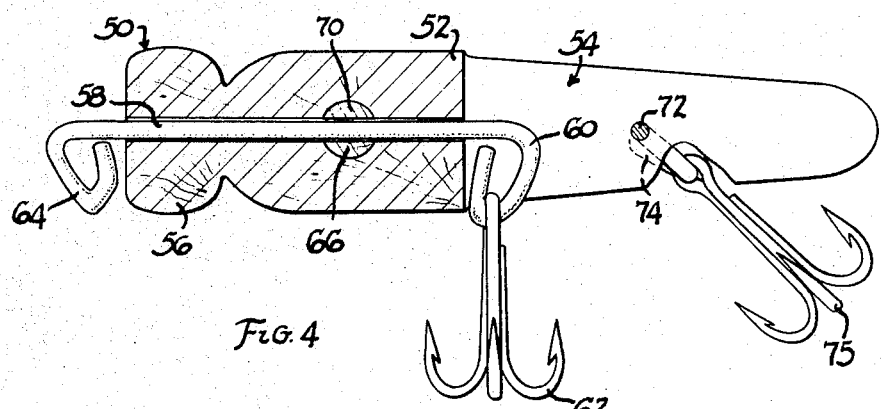
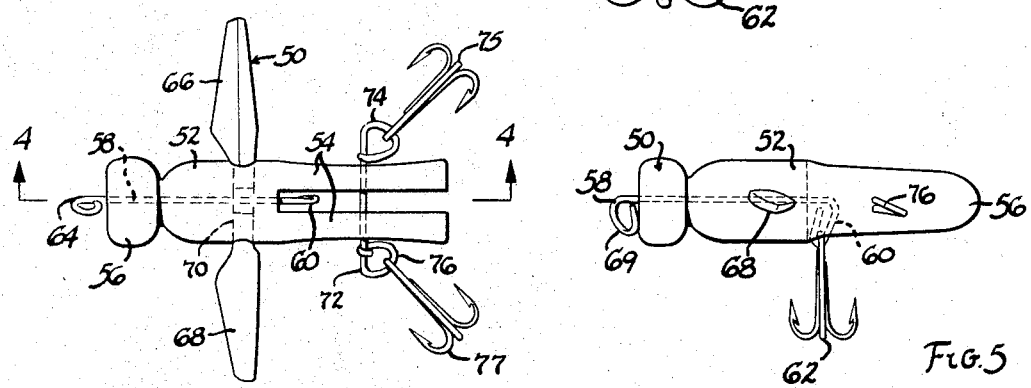

Filed Nov. 16, 1964  2 Sheets-Sheet 2

INVENTOR.
JOHN KURLOVICH
BY
Wilson, Settle & Craig
ATTORNEYS

United States Patent Office 3,344,548
Patented Oct. 3, 1967

3,344,548
FISHING LURE
John Kurlovich, 32225 MacKenzie,
Garden City, Mich. 48135
Filed Nov. 16, 1964, Ser. No. 411,205
3 Claims. (Cl. 43—42.08)

This invention relates to a castable fishing lure and provides an improved phantom lure of simple, durable and inexpensive construction generally simulating a large insect or minnow in appearance and having means for safely and easily attaching a fishing line or leader and multiple fishing hooks thereto and having means thereon adapted to provide an inwater spinning action or rotation tending to attract the attention of predatory fish of desired size.

In several illustrative lures herein shown and described, an elongated member of buoyant material is formed to provide a head at one end and one or two tail portions extending longitudinally from an intermediate body portion. A first wire member extends longitudinally through the head and body portions and is looped at opposite ends to form a line attaching eye at the head end of the lure and a depending hook attaching eye adjacent the tail. A second wire member is pivotally mounted and extends laterally through the tail portions and is looped to form two angularly adjustable hook attaching eyes. Wings attached to the lure body approximately at its center of buoyancy tend to rotate the lure during inwater movement effected by rod movement, trolling or retrieval of the lure by rewinding the fishing line on a casting reel.

The foregoing and other objects, features and advantages of the invention will be apparent from the following description of several illustrative advantages having reference to the accompanying drawings in which:

FIGURE 1 is a plan elevational view of one form of the invention with portions thereof being broken away and sectioned to show certain details of construction;

FIGURE 2 is a side elevational view showing the lure of FIGURE 1 with the several tail mounted side hooks removed;

FIGURE 3 is a view similar to FIGURE 1 showing a second modified form of the invention;

FIGURE 4 is an enlarged sectional view and is taken substantially in the plane indicated at 4—4 in FIGURE 3;

FIGURE 5 is a side elevational view similar to FIGURE 2 and further illustrates the second form of the invention;

Figure 6:
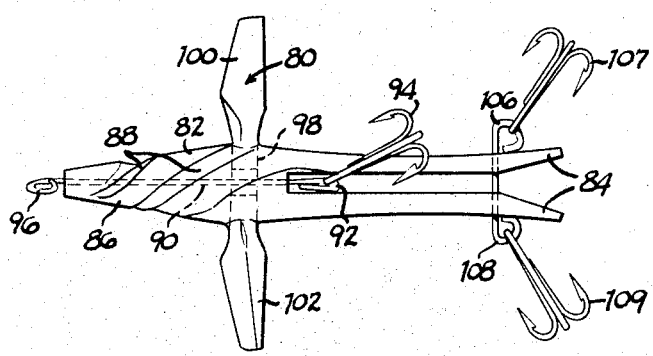
FIGURE 6 is a plan elevation view of a third form of the invention.

Referring now more particularly to FIGURES 1 and 2, a fishing lure constructed in accordance with several aspects of the invention is indicated generally by the reference numeral 10. The lure 10 comprises an elongated cylindrical member 12 preferably made of wood or similar buoyant material. The member 12 is slotted from one end to form two laterally spaced tail portions 14 extending longitudinally from opposite sides of the body portion formed by the other end of the member 12. A cylindrical head forming member 16 is spaced coaxially of the body portion by an annular spacer or bearing washer 18.

A wire member 20 extends longitudinally through the head member 16 and supports the body member 12 and the spacer 18 for rotation relative to the head member. A closed loop 22 formed intermediate the ends of the wire member 20 provides a thrust shoulder engageable with the end surface of the body between the spaced tail portions. The forward or lefthand end portion 24 of the wire, as viewed in FIGURES 1 and 2, is tightly embraced and frictionally restrained by the head member 16 and is loosely embraced by the intermediate body portion and spacer to permit relatively unrestricted rotation therebetween. The forward end of the wire 20 projects outwardly of the head member and is bent to form a closed loop or eye 26 adapted to secure the fishing line or leader adjacent the head end of the lure.

The opposite end portion of the wire member 20 extends rearwardly from the intermediate thrust loop 22 and projects outwardly from between the spaced tail portions 14. This projecting end portion is bent to form a cloesd eye 30 having a short reverse bend loosely catching the longitudinal portion of the wire member. The wire formed eye 30 is thus adapted to receive and secure the eye of a triple hook 32, as shown, for pivotal swinging movement therebetween. The bent over end of eye 30 permits the hook to be quickly, easily and safely mounted on the lure. The hook 30 is thus directly connected to the fishing line through the wire member 20.

The body portion of the member 12 is intersected by a transverse bore 34. Two wing or propeller blade members 36 and 38 are suitably mounted in opposite ends of the bore and project laterally outwardly therefrom. These blade members are oppositely inclined and adapted to rotate the body and tail portions relative to the head portion, as the lure is causes to move through the water by the initial casting throw, and by subsequent rod movement, trolling or rewinding of the fishing line. Such inwater rotation causes the lure, which is preferably colored to simulate a large insect or minnow, to appear alive and thus tends to attract the attention of various predatory fish.

The lure 10 is provided with several additional or alternative hook mounting locations. As best shown in FIGURE 1, the two tail portions 14 are laterally intersected at 40 and pivotally support the intermediate portion of a second wire member 42. The two outwardly projecting end portions of this wire are bent inwardly, as shown, to form two coplanar and laterally spaced closed loops 44 and 46 adapted to mount additional hooks as shown at 45 and 47, respectively. The closed ends of these loops may be easily deflected to mount such additional hooks quickly and safely on the line attached lure.

In the modified form of the invention illustrated in FIGURES 3 through 5, inclusive, the lure 50 comprises a cylindrical body member 52 of buoyant material. This member is slotted from one end, as in the previous embodiment, to form two laterally spaced tail portions 54 extending longitudinally from an intermediate body portion. The opposite end of the body member is circumferentially grooved, as shown, to form a head portion 56 integral with the intermediate body portion.

A wire member 58 extends longitudinally through an enlarged opening in the head and intermediate body portions of the member 52. The projecting end portions of this wire are bent to form a first loop 60 engageable with the intermediate body portion between the tail portions and projecting outwardly therefrom, and a second loop 64 engageable with the adjacent end surface of the head portion 56.

The wire formed loop 60 in cooperation with the adjacent tail forming surfaces of the body member is adapted to receive and secure the eye of a fishing hook, such as the triple hook 62 shown in the several drawing figures, with minimum effort and hazard. The head adjacent loop 64 is similarly adapted to provide easy attachment to a fishing line or a leader preferably containing a rotatable swivel connection, not shown, immediately adjacent the loop 64. Such a swivel connection permits two wing members or blades 66 and 68 mounted in and projecting outwardly of the intermediate body portion to rotate the lure 50 without excessive twisting of the fishing line attached thereto. As in the previous embodiment, the wings 66 and 68 are oppositely inclined and suitably mounted in opposite ends of a bore 70 extending transversely through the body member 52 substantially at its center of buoyancy.

A second wire member 72 corresponding to the hook mounting wire 42 of the previous embodiment is pivotally mounted and extends laterally of the tail portions 54. Coplanar loops 74 and 76 formed by the projecting outer portions of this wire member are adapted to mount additional alternative hooks 75 and 76, respectively, as shown in FIGURES 3 and 4.

Figures 7, 9:
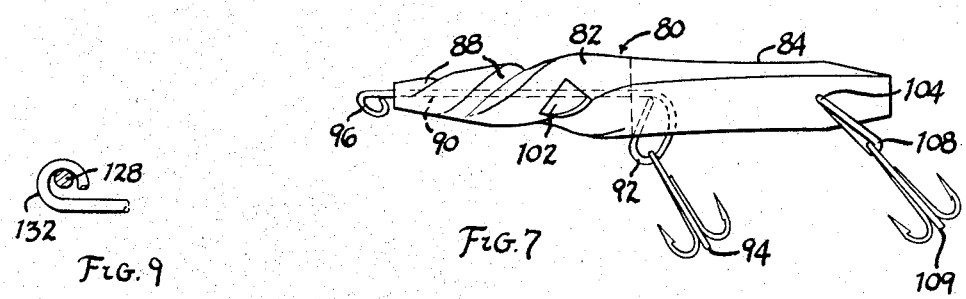
FIGURE 7 is a side elevational view of the illustrative lure of FIGURE 6.
FIGURE 9 is an enlarged fragmentary view further illustrating the tail supported, hook attaching wire formed eye of the lure shown in FIGURE 8.

The form of the invention shown in FIGURES 6 and 7 is similar to that of the previous embodiment, in that the head portion 86 is formed integrally of the intermediate cylindrical portion of a longitudinally slotted body member 82. However, the head portion 86 is tapered conically from the intermediate body portion and the tail portions are substantially longer. The lure 80 thus tends to simulate a small fish or minnow in appearance. The head and intermediate body portions of this embodiment are further provided with spaced helical grooves 88. These grooves are preferably painted to contrast with the helical outer surfaces of the lure body member 82.

A wire 90 similar to that of the previous wire member 58 extends through an enlarged opening formed longitudinally of the head and body portions. The projecting ends of the wire 90 are bent to form a hook mounting loop 92 extending outwardly from between the slot formed tail portions 84 and a forward line attaching loop 96. This forward loop 96 is closed by a reverse bend engaging the wire as it projects from the head end of the member 82. The line attaching loop is thus similar to the rear hook mounting wire loop 30 of the first embodiment. A fishing hook 94 may be mounted on the wire formed loop 92, as shown.

The body of the lure 80 is provided with a transverse bore 98 mounting two laterally extending blades 100 and 102 similar to those of the previous embodiments. These blades are inclined relative to body member 82 and adapted to rotate the lure as the lure is pulled longitudinally through the water. Such rotation induces a swirling movement in the water passing through the helical grooves and provides a "barber pole" optical effect tending to attract fish to the phantom lure. As with the previous embodiment, the lure 80 is preferably attached to the fishing line by a rotatable swivel connection, not shown, to prevent excessive twisting of the fishing line and possible fouling of the line as a result thereof.

A second hook mounting wire member 104 similar to 42 and 72 of the previous embodiments is pivotally mounted transversely of the tail portions 84. It should be noted however, that the wire 104 is mounted adjacent the free ends of the tail portions and that the coplanar hook mounting loops 106 and 108 each engage the outer surface of the adjacent tail portion. Such engagement may be used to angularly adjust the hook mounting loops relative to the tail portions. Deflection of the two tail portions relative to the wire formed loops 106 and 108 facilitates the mounting of additional fishing hooks 107 and 109 thereon.

Figure 8:
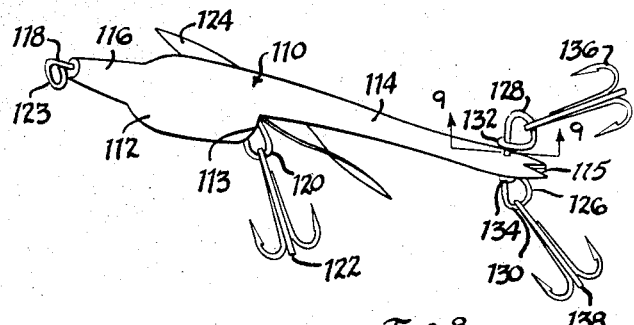
FIGURE 8 is a perspective view of another form of the invention.
Figure 10:
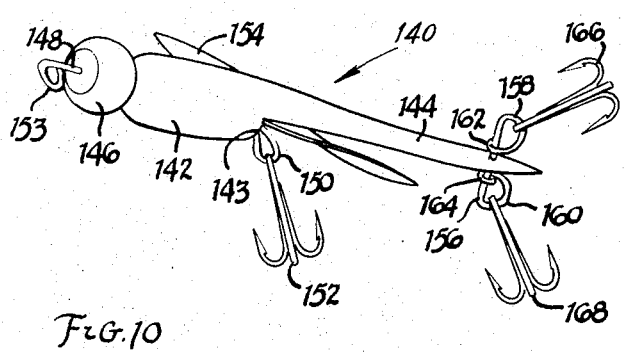
FIGURE 10 is a perspective view similar to FIGURE 8 and shows a lure of slightly different form.

The phantom lures 110 and 140 illustrated in FIGURES 8 and 10, respectively, are substantially the same, except for obvious differences in the contouring of their head portions 116 and 146 which are similar in contour to those of previous embodiments. However, the lures 110 and 140 are not longitudinally slotted to provide spaced tail portions and thus differ from the several previously described lures. The lures 110 are 140 are each provided with a relatively thin single tail 114 or 144, respectively, extending longitudinally from one side of a cylindrical body member 112 or 142. An end shoulder 113 or 143 is thus formed on the intermediate body portion of the members 112 and 142, respectively. A single sheet metal propeller or fin forming member 124 or 154 is mounted on the body adjacent the undersurface of each tail portion 114 or 144, respectively, and adapted to rotate its respective lure during longitudinal movement through the water.

In the lure illustrated in FIGURE 8, a wire 118 extends through the conically tapered head portion 116 and the intermediate portion of the body member 112. The rearwardly projecting end of the wire 118 is bent to form a loop 120 engageable with the body form shoulder 113 and adapted to removably mount a fishing hook 122. The projecting forward end of the wire 118 forms a loop 123 attachable to a fishing line through a rotatable connection.

A second hook mounting wire member 126 is pivotally mounted adjacent the rear end of tail portion 114 and is bent to form loops 128 and 130 engageable with the opposite sides of the tail portion and adapted to mount fishing hooks 136 and 138. As best shown in FIGURE 9, the end portions of these loops are each provided with a reverse bend loosely engaging the intermediate portion of the wire adjacent the tail portion. These wire end portions are deflectable relative to the tail portion and to the tail supported wire portion and thus permit the fish hooks 136 and 138 to be easily and safely mounted on the wire formed loops 128 and 130, respectively.

Returning briefly to FIGURE 10, a wire member 148 extends through the body member 142 and is bent to form a loop 150 adapted to removably mount a fish hook 152 and an end loop 153 attachable to a fishing line. A second wire member 156 similar to the wire 126 of the previous embodiment is pivotally mounted in the tail portion 144 and bent to form deflectable loops 158 and 160 adapted to removably mount fishing hooks 166 and 168.

From the foregoing description, it will be seen that the several illustrative embodiments are fully capable of providing the several stated objects, advantages and features of the invention. It will be further apparent that various changes might be made therein without departing from the spirit and scope of the invention as defined in the following claims.

I claim:

1. A fishing lure comprising an elongated member of buoyant material having a head portion formed at one end, an intermediate body portion, and a bifurcated rear portion forming two laterally spaced flexible tail portions extending longitudinally from said intermediate body portion, a first wire member extending longitudinally through said head and body portions and forming a first end loop attachable to a fishing line positioned close to the end surface of the head portion and a second end loop positioned close to the body portion intermediate the spaced tail portions and extending laterally therefrom to removably secure a first fishing hook, a second wire member pivotally mounted and extending through said tail portions and bent to form laterally spaced loops normally engageable with the outer surfaces of the tail portions and adapted to removably and adjustably mount fishing hooks thereon, said tail portions being deflectable inwardly to permit mounting of fishing hooks on the laterally spaced wire loops, and a pair of wing members secured to said intermediate body portion and formed to rotate said buoyant member about its attachment to the fishing line.

2. In a fishing lure, an elongated member of buoyant material having one end attachable to a fishing line, an intermediate body portion and a bifurcated opposite end portion forming two laterally spaced flexible tail portions extending longitudinally from an intermediate body portion and adapted to rotate said buoyant member about its attachment to the fishing line, a wire hook mounting member pivotally mounted and extending through said tail portions and bent to form laterally spaced loops normally engageable with the outer surfaces of the tail portion and adapted to removably and adjustably mount fishing hooks thereon, and said tail portions being deflectable inwardly to permit mounting of fishing hooks on said laterally spaced wire loops.

3. In a lure as set forth in claim 2, said body portion being conically tapered toward its line attached end and having a spaced plurality of helical grooves therein complementing the lure rotating action of the wing members.

References Cited

UNITED STATES PATENTS

| | | | |
|---|---|---|---|
| 1,756,260 | 4/1930 | Pflueger | 43—42.46 X |
| 1,831,178 | 11/1931 | Horber | 43—42.46 X |
| 2,159,230 | 5/1939 | Sage | 43—42.48 X |
| 2,281,480 | 4/1942 | Clark | 43—42.13 |
| 2,306,020 | 12/1942 | Hughes et al. | 43—42.21 |

ALDRICH F. MEDBERY, *Primary Examiner.*

SAMUEL KOREN, WARNER H. CAMP, *Examiners.*